United States Patent Office 2,699,026
Patented Jan. 11, 1955

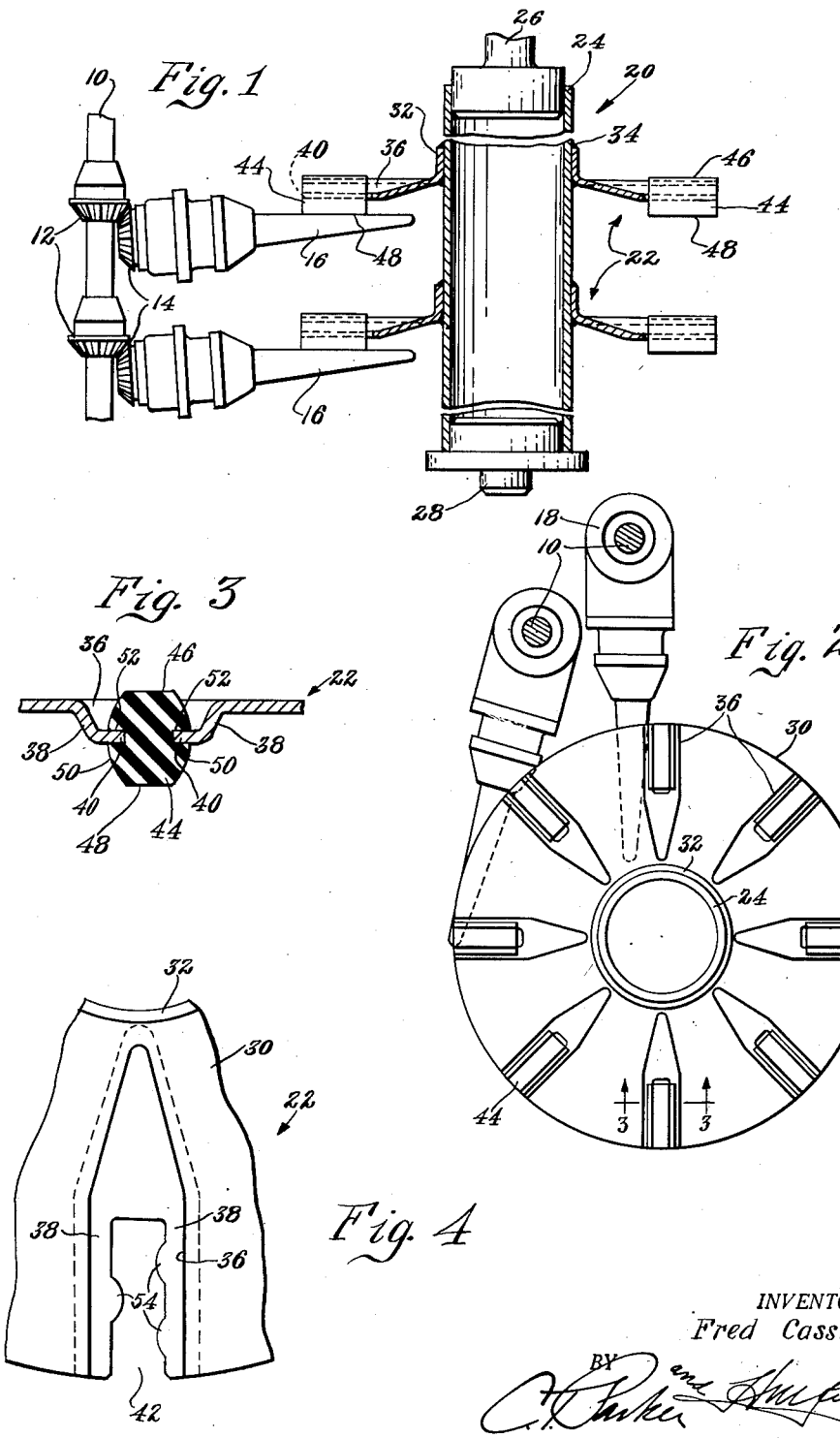

2,699,026

COTTON PICKER DOFFER

Fred Cassidy, Des Moines, Iowa, assignor to Deere Manufacturing Co., Dubuque, Iowa, a corporation of Iowa Application May 5, 1953, Serial No. 353,034

14 Claims. (Cl. 56—41)

This invention relates to doffing means for a cotton picker and more particularly to improvements in the dooffing means per se in which the principal objects of the invention are to provide a doffer that is relatively inexpensive, one that may be readily kept in condition by replacing various parts thereof from time to time, and one that may be utilized in machines of existing designs.

The conventional cotton picker of the spindle type comprises one or more cotton-picking drums mounted on upright axes and having a plurality of columns arranged about those axes, from each of which columns projects a series of vertically spaced spindles (barbed or otherwise). The drums are arranged in a mobile frame so that as the machine advances, plants in a cotton row are received between a pair of cooperating drums so that the spindles or fingers project into the plants and pick the cotton therefrom. The drums, as well as the spindles, rotate as the machine advances and the moving spindles are caused to pass through doffing means. Broadly, the doffing means comprises an upright shaft on which is a plurality of disks or equivalent means spaced apart vertically on the order of the spacing of the series or layers of spindles. The purpose of each doffer in each doffing means is to engage the cotton on the associated spindles and to remove that cotton by a wiping or brushing action.

The fundamental principles just outlined have been known for many years and the present development of the industry concerned with cotton-picking machines is improvement in various important details expected to minimize the complexity of the machine and to cut down as much as possible the cost of maintenance. It has been found that the individual doffers in the conventional cotton picker wear to a considerable extent and must be replaced from time to time. If the doffers are designed in such manner that they are assembled on a shaft to form an integral structure, replacement of one or more doffers requires disassembly of the entire shaft, before which the shaft itself must be removed from the machine. Various efforts have heretofore been made to provide individual doffing elements that will eliminate the difficulty just referred to, but in the main these have not proved entirely successful. According to the present invention, the difficulty is solved by the provision of a doffer comprising a plurality of disks, each equipped with several individually removable and replaceable doffing members or blocks. Each disk has a plurality of radial slots and the fit between the slots and the blocks is such that the blocks are normally retained in place during operation but may be forcibly removed for replacement. It is a feature of the invention that the block may be removed, turned 180° and replaced to present a new doffing surface as the original surface becomes worn.

The foregoing and other important objects and desirable features inherent in and encompassed by the invention will become apparent as a preferred disclosure of various forms of the invention are made in the following specification and accompanying drawings, in which Fig. 1 is a fragmentary elevational view with parts broken away and shown in section of that much of a cotton picker and doffing mechanism deemed necessary to illustrate the present case.

Fig. 2 is a plan view of the device shown in Figure 1 with the stub shaft omitted.

Fig. 3 is an enlarged transverse sectional view as seen substantially along the line 3—3 of Fig. 2.

Fig. 4 is a fragmentary view, on the scale of Fig. 3, showing a portion of the outermost edge of the disk and the block-retaining elements involved therein.

As suggested above, only so much of a cotton picker is illustrated as is deemed necessary to disclose the present invention. For that purpose, there is shown in Fig. 1 is an upright shaft 10 having thereon a plurality of bevel pinions 12 respectively in mesh with bevel pinions 14 on the inner ends of outwardly projecting cotton picker spindles 16. In one well-known type of machine, there will be twelve to sixteen shafts like the shaft 10 and each of these will be contained in an upright picker bar or column 18 (Fig. 2). These columns, with their contained shafts, will be arranged about the axis of the drum and the drum is arranged for rotation so that the columns travel in an orbit about the drum axis. The spindles 16 project radially from the general drum assembly and, in the typical machine referred to, there will be twenty spindles projecting from each bar 18. The spindles are tapered to small outer ends and are arranged with their axes at an angle to the horizontal so that the uppermost element of the cone defining the spindle will travel in a horizontal plane. Thus, there are several rows or layers of spindles, vertically spaced as respects the axis of the drum.

The doffing mechanism, designated generally at 20, has a plurality of wheel-like doffing elements, each designated generally by the numeral 22 spaced axially on a central elongated support in the form of a tubular shaft 24, so that each doffing element cooperates with its associated layer of spindles 16. There will be, of course, as many elements 22 as there are layers of spindles (here twenty). The tubular shaft 24 is closed at its upper and lower ends respectively by stub shafts 26 and 28 to enable the mounting of the shaft for rotation in any suitable support (not shown).

Each element 22 is in the form of a disk having an outer peripheral edge 30 and a central hub portion 32 to enable mounting of the disk on the central shaft 24. The mounting of the disk and the securing thereof to the shaft may be accomplished by welding, as at 34. Each disk is deformed about its outermost edge or periphery to form a plurality of pockets 36. These pockets are circumferentially spaced and each is elongated on a radius of the disk. Each pocket has a pair of axially directed side walls 38, the magnitude and direction of which are the same so that marginal edge portions 40 of these side walls are spaced apart circumferentially to define an elongated narrow slot 42. The marginal edge portions 40 provide gripping means, for a purpose to be presently described. The general disposition of the gripping means provided by the marginal edges 40 is such that these portions are offset axially from the general plane of the disk (Fig. 3). The offset may be provided by embossing in the case of a sheet metal disk or by any other suitable means in the event that it is desirable to construct the disk of some other material.

The gripping means 40—40 provides means for mounting on the disk a plurality of doffing elements or blocks 44, there being as many of these blocks as there are slots 42. Each block is preferably of non-metallic material having some resiliency so that it is capable of compression and expansion. Each block has upper and lower surfaces 46 and 48 respectively and opposite sides 50. As seen in the drawings, the blocks are symmetrical from top to bottom so that they may be turned on either side. Each side of the block is provided with a groove 52, and these grooves are symmetrical relative to the upper and lower surfaces 46 and 48. Each block is somewhat shorter in length than the radial depth of a slot 42.

Installation of each block is accomplished by forcing the block radially inwardly of a slot 42, the gripping means 40 fitting or receiving the grooves 52 in opposite sides of the block. Since the block is capable of deformation, it is slightly compressed upon insertion but the natural expansion thereof presses the side portions tightly into engagement with the marginal edge portions of the slot. The force fit between the marginal edge portions 40 and the block constitutes the sole means holding the block in place. In short, the block, although normally retained in place during operation, may be forcibly removed by sliding it radially outwardly or in an endwise direction, and a new block may be installed in the opposite direction. Because of the pocket structure 36, the lower surface 48, which normally engages the upper surfaces or elements of the associated layer of spindles 16, constitutes a doffing surface, and the other surface 46, although idle, is somewhat protected by lying generally near the plane of the upper surface of the disk 22. Consequently, when the lower surface 48 becomes worn to an extent in which the doffing efficiency falls off, the block may be forcibly removed outwardly from its slot, inverted, and replaced, thus presenting the surface 46 as a doffing element.

In order that the gripping effectiveness between each block and its associated slot may be increased, the marginal edge portions 40 have means thereon, here in the form of projections 54, for improving the tightness of the force fit.

As will be seen, the disks 22 may be readily constructed of sheet metal or the like, and the blocks may be readily formed from rubber or rubber-like material by the extrusion process, for example. The blocks themselves will prove to be relatively inexpensive and the interchangeability and replaceability thereof are marked improvements over doffers heretofore known.

Other important features and desirable objects not specifically enumerated herein will undoubtedly occur to those versed in the art, as will various modifications and alterations in the preferred embodiment of the invention illustrated, all of which may be achieved without departing from the spirit and scope of the invention.

What is claimed is:

1. A cotton picker doffer element of the character described, comprising: a rotatable disk having an outer peripheral edge and formed with a plurality of radial slots spaced circumferentially and opening at and extending radially inwardly from said peripheral edge, said slots being respectively intersected by radii of the disk and each slot having opposed marginal edge portions lying generally parallel to the associated intersecting radius of the disk, said disk being so shaped at the marginal edge portions of the slots that said edge portions are axially offset from the general radial plane of the disk, all of said edge portions being so offset in the same direction and to the same extent so as to be coplanar as respects each other; and a plurality of doffing members, equal in number to and carried respectively by the slots, each member having a force fit between opposed marginal edge portions so as to be normally incapable of separation from the disk during rotation thereof but capable of being forcibly inserted into and withdrawn from its slot respectively in inward and outward radial directions.

2. The invention defined in claim 1, in which: at least one marginal edge portion of each slot has projecting means thereon to increase the tightness of the fit between the slot and its doffing member.

3. The invention defined in claim 1, in which: each doffing member is of resilient distortable material capable of compression for insertion into its slot and of expansion for increasing its grip on the marginl edges of the slot.

4. The invention defined in claim 1, in which: each doffing member is in the form of a block having opposed sides respectively complementing the marginal edges of its slot, and each of said sides is grooved to receive the associated marginal edge portion.

5. The invention defined in claim 4, in which: each block additionally has top and bottom surfaces and the grooves are symmetrical as respects said surfaces so that the block may be inserted into its slot selectively in either of two positions.

6. A cotton picker doffer element of the character described, comprising: a rotatable disk having an outer peripheral edge and formed with a plurality of radial slots spaced circumferentially and opening at and extending radially inwardly from said peripheral edge, each slot having opposed marginal edge portions lying generally parallel to a radius of the disk; and a plurality of doffing members, equal in number to and carried respectively by the slots, each member having a force fit between opposed marginal edge portions so as to be normally incapable of separation from the disk during rotation thereof but capable of being forcibly inserted into and withdrawn from its slot respectively in inward and outward radial directions, the engagement of the members respectively with the marginal edge portions of the slots constituting the sole means for retaining the members in the disk.

7. The invention defined in claim 6, in which: at least one marginal edge portion of each slot has projecting means thereon to increase the tightness of the fit between the slot and its doffing member.

8. The invention defined in claim 6, in which: said doffing member is of resilient distortable material capable of compression for insertion into its slot and of expansion for increasing its grip on the marginal edges of the slot.

9. The invention defined in claim 8, in which: each doffing member is in the form of a block having opposed sides respectively complementing the marginal edges of its slot, and each of said sides is grooved to receive the associated marginal edge portion.

10. The invention defined in claim 9, in which: each block additionally has top and bottom surfaces and the grooves are symmetrical as respects said surfaces so that the block may be inserted into its slot selectively in either of two positions.

11. A cotton picked doffer element of the character described, comprising: a rotatable disk having an outer peripheral edge and formed with a plurality of circumferentially spaced pockets about said peripheral edge, each pocket being elongated on a radius of the disk and having a pair of opposed side walls directed away from the general plane of the disk in the same axial direction and to the same extent, said side walls of each slot respectively having circumferentially spaced apart marginal edge portions defining a radial slot opening radially outwardly at the periphery of the disk; and a plurality of doffing members, equal in number to and carried respectively by the slots, each member having a force fit between opposed marginal edge portions so as to be normally incapable of separation from the disk during rotation thereof but capable of being forcibly inserted into and withdrawn from its slot respectively in inward and outward radial directions.

12. A cotton picker doffer element of the character described, comprising: a rotatable disk having a plurality of slots spaced circumferentially thereabout, each slot having opposed marginal edge portions providing gripping means; and a plurality of doffing members, equal in number to and carried respectively by the slots, each member having opposite side portions respectively gripped by the associated gripping means of the associated slot so as to be normally incapable of separation from the disk during rotation thereof but capable of being forcibly inserted into and withdrawn from its slot, the engagement of the member respectively with the gripping means constituting the sole means for retaining the member in the disk.

13. A cotton picker doffer of the character described, comprising: a rotatable wheel-like element having a plurality of slot means spaced circumferentially thereabout, each slot opening generally radially outwardly and each slot further having opposed marginal edge portions providing gripping means; and a plurality of doffing members, equal in number to and carried respectively by the slots, each member having opposite side portions respectively gripped by the associated gripping means of the associated slot so as to be normally incapable of separation from the element during rotation thereof but capable of being forcibly inserted into and withdrawn from its slot, the engagement of the member respectively with the gripping means constituting the sole means for retaining the member in the element.

14. A cotton picker doffer of the character described, comprising: a rotatable wheel-like element having a plurality of slot means spaced circumferentially thereabout, each slot opening generally radially outwardly and each slot further having opposed marginal edge portions providing gripping means; and a plurality of doffing members, equal in number to and carried respectively by the slots, each member having opposite side portions respectively gripped by the associated gripping means of the associated slot so as to be normally incapable of separation from the element during rotation thereof but capable of being forcibly inserted into and withdrawn from its slot.

References Cited in the file of this patent

UNITED STATES PATENTS

| 423,542 | Todd | Mar. 18, 1890 |
| 2,247,682 | Hagen | July 1, 1941 |
| 2,619,784 | Paradise | Dec. 2, 1952 |
| 2,654,202 | Millard | Oct. 6, 1953 |
| 2,654,203 | Parkerton | Oct. 6, 1953 |